US007302267B2

(12) United States Patent
Lee et al.

(10) Patent No.: US 7,302,267 B2
(45) Date of Patent: Nov. 27, 2007

(54) APPARATUS AND METHOD FOR ESTIMATING A VELOCITY OF A MOBILE TERMINAL IN A MOBILE COMMUNICATION SYSTEM

(75) Inventors: Ji-Ha Lee, Seoul (KR); Sung-Kwon Jo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 439 days.

(21) Appl. No.: 10/940,951

(22) Filed: Sep. 15, 2004

(65) Prior Publication Data

US 2005/0059356 A1    Mar. 17, 2005

(30) Foreign Application Priority Data

Sep. 16, 2003 (KR) ............... 10-2003-0064042

(51) Int. Cl.
*H04Q 7/20* (2006.01)
(52) U.S. Cl. ............ 455/441; 455/226.1; 455/67.16; 455/67.11; 455/561; 455/345; 455/550.1; 455/352; 455/418; 342/104; 342/106; 342/405; 342/402; 342/357.05; 342/461
(58) Field of Classification Search ............ 455/67.11, 455/67.16, 441, 567, 561, 226.1, 67.1, 352, 455/418, 550.1; 342/461, 84, 99, 105, 357.05, 342/104, 106, 402, 405
See application file for complete search history.

(56) References Cited

U.S. PATENT DOCUMENTS

| | | | | |
|---|---|---|---|---|
| 5,513,221 A | * | 4/1996 | Parr et al. | 375/344 |
| 6,061,021 A | * | 5/2000 | Zibell | 342/418 |
| 6,288,674 B1 | * | 9/2001 | Sengupta et al. | 342/418 |
| 6,370,357 B1 | * | 4/2002 | Xiao et al. | 455/67.11 |
| 6,564,042 B1 | * | 5/2003 | Jou et al. | 455/238.1 |
| 6,647,055 B2 | * | 11/2003 | Kuo | 375/148 |
| 6,718,174 B2 | * | 4/2004 | Vayanos | 455/456.1 |
| 6,842,624 B2 | * | 1/2005 | Sarkar et al. | 455/522 |
| 6,907,259 B1 | * | 6/2005 | Nilsson | 455/522 |
| 6,928,274 B2 | * | 8/2005 | Da Rocha et al. | 455/226.2 |
| 6,987,971 B2 | * | 1/2006 | Kirsch | 455/441 |
| 7,099,673 B2 | * | 8/2006 | Yamashita | 455/452.2 |
| 2002/0042279 A1 | * | 4/2002 | Da Rocha et al. | 455/456 |

(Continued)

FOREIGN PATENT DOCUMENTS

CN    1312625    9/2001

(Continued)

*Primary Examiner*—Lana Le
*Assistant Examiner*—Amar Daglawi
(74) *Attorney, Agent, or Firm*—Roylance Abrams, Berdo, & Goodman, L.L.P.

(57) ABSTRACT

A Base Station (BS) apparatus for estimating a velocity of a Mobile Station (MS) in a mobile communication system includes a channel estimator for performing channel estimation according to a velocity band, receiving a wireless channel signal from the MS, and performing channel estimation using channel estimation coefficients optimized for individual velocity bands; and a velocity estimator for dividing the velocity band into a plurality of sub-Doppler bands, detecting a sub-Doppler band including a frequency index having a maximum frequency response from among the divided sub-Doppler bands, and transmitting information of the detected sub-Doppler band to the channel estimator such that a channel estimation coefficient corresponding to the information is transmitted.

18 Claims, 14 Drawing Sheets

U.S. PATENT DOCUMENTS

| | | | |
|---|---|---|---|
| 2002/0177450 A1* | 11/2002 | Vayanos | 455/456 |
| 2003/0003914 A1* | 1/2003 | Kubo et al. | 455/441 |
| 2003/0054771 A1* | 3/2003 | Chappaz | 455/67.1 |
| 2003/0064729 A1* | 4/2003 | Yamashita | 455/451 |
| 2004/0082331 A1* | 4/2004 | Peng | 455/441 |
| 2005/0089124 A1* | 4/2005 | Valle | 375/346 |
| 2006/0133457 A1* | 6/2006 | Wang et al. | 375/148 |

FOREIGN PATENT DOCUMENTS

JP 10-065610 3/1998

* cited by examiner

APPARATUS AND METHOD FOR ESTIMATING A VELOCITY OF A MOBILE TERMINAL IN A MOBILE COMMUNICATION SYSTEM

PRIORITY

This application claims the benefit under 35 U.S.C. 119(a) of an application entitled "APPARATUS AND METHOD FOR ESTIMATING VELOCITY OF MOBILE TERMINAL IN MOBILE COMMUNICATION SYSTEM", filed in the Korean Intellectual Property Office on Sep. 16, 2003 and assigned Serial No. 2003-64042, the entire contents of which are hereby incorporated by reference.

BACKGROUND OF THE INVENTION

1. Field of the Invention

The present invention relates to an apparatus and method for estimating the velocity of a mobile terminal. More particularly, the present invention relates to an apparatus and method for estimating the velocity of a mobile terminal in a mobile communication system.

2. Description of the Related Art

Mobile communication systems were developed to provide a mobile terminal (also called a mobile station (MS)) with mobility. The mobile communication system forms a channel between a base station (BS) and the MS to guarantee the mobility of the MS, such that it performs voice and data communication over the channel. The MS provides the mobility, such that a wireless signal generated from the MS does not always transmit an output signal at a fixed position. Specifically, the MS can constantly transmit the wireless signal at different positions, such that an environment and a path of a wireless channel are continuously changed. The MS moves with its user, such that it can transmit a wireless signal in a stationary state, or can transmit the wireless signal while in motion at a low or high speed.

As previously discussed, channel environments change in the mobile communication system, and a transmission path of a wireless signal also changes due to the change in an MS's position, such that the mobile communication system must receive data in consideration of the changed channel environments, the changed MS's position and the speed of the MS, and so on. Specifically, the mobile communication system estimates a transmission channel of the MS, and extracts data according to the estimated result. Therefore, provided that channel estimation of the MS is not correctly performed, the mobile communication system cannot extract correct data. Specifically, if the mobile communication system cannot estimate a correct channel, it is unable to extract data.

The channel estimation method of the mobile communication system will hereinafter be described. The mobile communication system transmits data to the MS over a forward link from the BS to the MS. In this case, the BS transmits a traffic channel signal and a pilot signal in order to allow the MS to perform channel estimation. The MS transmits data to the BS over a reverse link transmitted to the BS. In this case, the MS transmits a reverse pilot signal to allow the BS to estimate a reverse channel. Upon receiving the reverse pilot signal from the MS, the BS performs channel estimation using the received reverse pilot signal. The BS decodes a traffic signal received from a corresponding MS on the basis of the channel-estimated value. In this manner, if the decoding of the traffic signal is performed, data reception performance can be improved.

However, the Doppler shift occurs in a reverse pilot channel and a reverse traffic channel according to the velocity of the MS. Due to the Doppler shift, real channel estimation performance may deteriorate. Specifically, the real channel estimation performance changes in proportion to the shifting degree of a received signal. Also, the Doppler shift effect results in different values according to the velocity of the MS. Therefore, the BS must remove the Doppler shift at individual velocities of the MS to fully remove the Doppler shift effect and must also perform channel estimation at individual velocities of the MS, such that the BS requires a channel estimator at each velocity of the MS in order to remove the Doppler shift effect and perform channel estimation.

A method for estimating such velocities of the MS in a mobile communication system will hereinafter be described. The mobile communication system has divided the velocity of the MS into several velocity zones, and has a previously-designed optimum channel estimator for providing optimum channel estimation performance at each velocity zone. In this case, a plurality of channel estimators are used according to different velocities of the MS, such that a category of the channel estimator to be used must first be determined. In order to select the category of the channel estimator, a velocity estimator is required to estimate the velocity of the MS on the basis of a received signal. There are two methods for implementing the velocity estimator, i.e., a first method for adapting an autocorrelation function of a received signal in a time domain, and a second method for adapting a Discrete Fourier Transform (DFT) in a frequency domain.

As described above, the velocity estimator using the DFT in a frequency domain requires a procedure for estimating the Doppler spectrum using $M_{dft}$-point DFTs. However, if all the $M_{dft}$-point DFTs are calculated to estimate the shape of the Doppler spectrum, unnecessary resources may be wasted. Furthermore, the higher the velocity of the MS, the wider the Doppler spectrum bandwidth. Therefore, the number of channel estimation coefficients used according to widened Doppler bandwidths increases, and the number of frequency indexes to be calculated to estimate the Doppler spectrum also increases.

SUMMARY OF THE INVENTION

Therefore, the present invention has been made in view of the above problems, and it is an object of the present invention to provide an apparatus and method for efficiently performing data demodulation/decoding by performing correct channel estimation irrespective of the velocity of a Mobile Station (MS) in a mobile communication system.

It is another object of the present invention to provide an apparatus and method for implementing a velocity measurement device adapted to measure the velocity of an MS moving at a high speed, allowing the velocity measurement device to perform a Discrete Fourier Transform (DFT) for a minimum number of frequency indexes, and therefore efficiently managing resources.

In accordance with one aspect of the present invention, the above and other objects can be accomplished by the provision of a Base Station (BS) apparatus for estimating a velocity of a Mobile Station (MS) in a mobile communication system. The apparatus comprises a channel estimator for performing channel estimation according to a velocity band, receiving a wireless channel signal from the MS, and performing channel estimation using channel estimation coefficients optimized for individual velocity bands; and a velocity estimator for dividing the velocity band into a plurality of sub-Doppler bands, detecting a sub-Doppler band including a frequency index having a maximum frequency response from among the divided sub-Doppler bands, and transmitting information of the detected sub-Doppler band to the channel estimator such that a channel estimation coefficient corresponding to the information is transmitted.

In accordance with another aspect of the present invention, there is provided a method for estimating a velocity of a Mobile Station (MS) in a Base Station (BS) device of a mobile communication system. The method comprising the steps of selectively determining a channel estimation process according to a velocity band, receiving a wireless channel signal from the MS, and performing channel estimation using channel estimation coefficients optimized for individual velocity bands; and dividing the velocity band into a plurality of sub-Doppler bands, detecting sub-Doppler band information corresponding to the estimation coefficients from a sub-Doppler band including a frequency index having a maximum frequency response from among the divided sub-Doppler bands during a predetermined period, and changing a detection position of the sub-Doppler band including the frequency index having the maximum frequency response according to the velocity of the MS such that a velocity estimation step is performed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
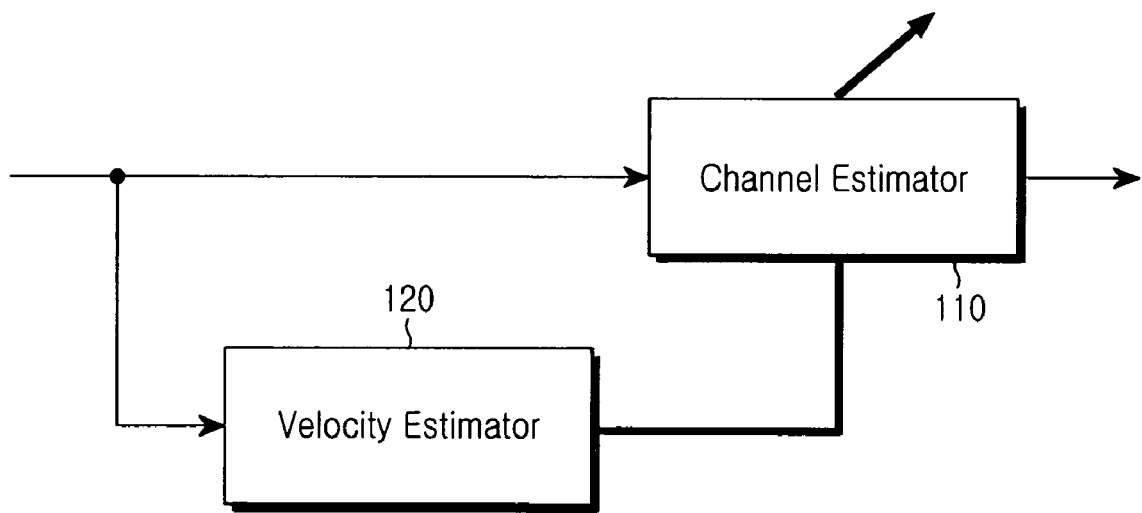
FIG. 1 is a block diagram illustrating a velocity estimator for use in a Base Station (BS) in accordance with an embodiment of the present invention.

Embodiments of the present invention will now be described in detail with reference to the accompanying drawings. In the drawings, the same or similar elements are denoted by the same reference numerals even though they are depicted in different drawings. In the following description, a detailed description of known functions and configurations incorporated herein will be omitted for conciseness.

FIG. 1 is a block diagram illustrating a velocity estimator for use in a Base Station (BS) in accordance with an embodiment of the present invention.

Referring to FIG. 1, the velocity estimator includes a channel estimator 110 and a velocity estimator 120. The velocity estimator 120 estimates the velocity of a Mobile Station (MS) to control the channel estimator 110.

The channel estimator 110 is used differently according to individual velocity bands, and performs channel estimation using optimum estimation coefficients of individual velocity bands. The channel estimation coefficients are optimized in $M_{vel}$ Doppler frequency bands corresponding to $M_{vel}$ velocity bands, and may also be designed using an offline method. Individual Doppler frequency bands in which individual channel estimation coefficients are used are detected using a Discrete Fourier Transform (DFT) method. The DFT for detecting the Doppler band collects $M_{dft}$ input signal samples, and is applied to a minimum number (q) of frequency indexes $n_i$ (where i=0~q−1) capable of classifying $M_{vel}$ Doppler bands. In this case, the frequency index $n_i$ at which the DFT is performed is established to classify the $M_{vel}$ Doppler bands, and individual frequency indexes are bound by $M_{vel}$ detection sets (Si, i=$M_{vel}$−1) shown in the following equation 1, such that it can perform the last detection.

$$S_0 = \{n_0, \ldots, n_i\}$$
$$S_1 = \{n_{i+1}, \ldots, n_j\}$$
$$\vdots$$
$$S_{M_{vel}-1} = \{n_k, \ldots, n_{q-1}\}$$

Equation 1

With reference to Equation 1, individual variables are arranged in the order of 0<i<j<k<q−1.

The velocity estimator 110 for detecting the Doppler band estimates the power spectrum $P(n_i)$ using a DFT in association with all the frequency indexes $(n_i)$, and detects a frequency index $n_{max}$ at which a maximum power spectrum magnitude is observed. The maximum power spectrum magnitude can be represented by the following equation 2:

$$n_{\max} = \max_{n_i}\{P(n_i), i = 0 \sim q - 1\}$$

Equation 2

The set including the detected maximum frequency index $n_{max}$ can be denoted by $S_{max}(S_{max} \in \{S_0, S_1, \ldots, S_{M_{vel}-1}\})$. Therefore, the velocity estimator 110 controls a channel estimation coefficient $COEF_{max}(COEF_{max} \in \{COEF_0, COEF_1, \ldots, COEF_{M_{vel}-1}\})$ designed for the Doppler band corresponding to $S_{max}$, such that the channel estimator 120 can use the channel estimation coefficient. The control operations will hereinafter be described with reference to the accompanying drawings.

Figure 2:
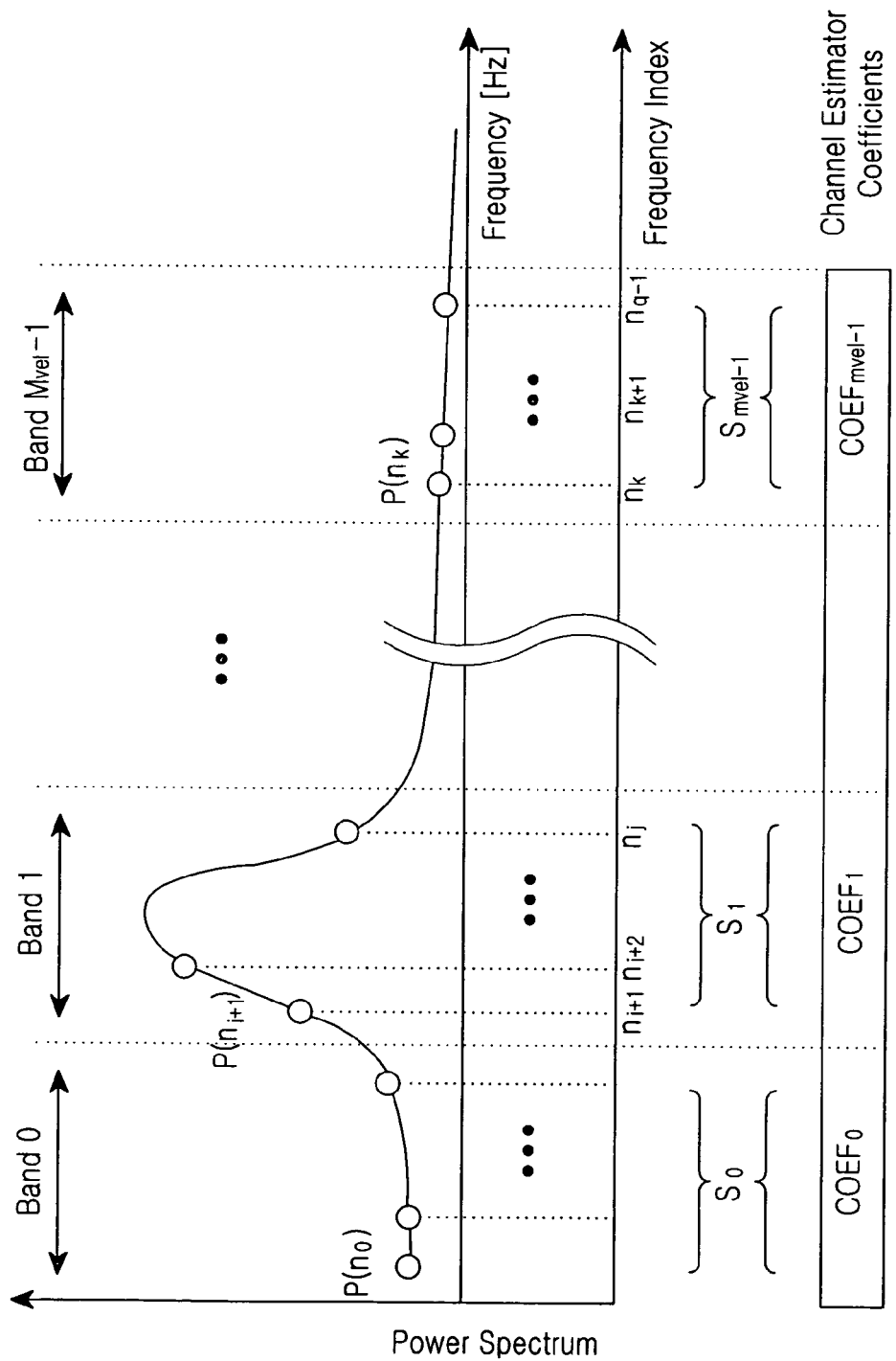
FIG. 2 is an example of selecting a channel estimation coefficient in accordance with an embodiment of the present invention.

FIG. 2 is an example of selecting a channel estimation coefficient in accordance with an embodiment of the present invention.

In FIG. 2, the X-axis is indicative of frequency indexes $n_0, \ldots, n_i, n_{i+1}, \ldots, n_j, \ldots, n_k, \ldots, n_{q-1}$, the Y-axis is indicative of a power spectrum. The overall Doppler band is divided into sub-Doppler bands (Band 0~$M_{vel}$−1) according to the frequency indexes. The set of frequency indexes contained in each sub-Doppler band is denoted by $S_0, S_1, \ldots, S_{M_{vel}-1}$, and channel estimation coefficients corresponding to each set of frequency indexes are denoted by $COEF_0, COEF_1, \ldots, COEF_{M_{vel}-1}$.

If the velocity of the MS is increased, the bandwidth of the Doppler band to be detected is increased in proportion to the velocity of the MS. Specifically, in order to detect a high velocity, the number $M_{vel}$ of channel estimation coefficients must be increased. Therefore, the number (q) of frequency indexes $n_i$ for detecting the Doppler band is also increased. If the number (q) of frequency indexes is increased, the amount of resources needed to implement the velocity estimator is also increased. Accordingly, a high velocity must be detected without increasing the amount of necessary resources using only a minimum number (q) of frequency indexes needed for estimating the power spectrum of the Doppler band.

The velocity estimator 110 subdivides an overall Doppler band, which is to be detected to maintain a minimum number (q) of frequency indexes, into sub-Doppler bands as shown in FIG. 2, and estimates the power spectrum of a partial Doppler band among the sub-Doppler band. As can be seen from the graph of FIG. 2, it can be recognized that a frequency index $n_{max}$, at which the maximum power spectrum magnitude is observed, is equal to a frequency index $n_{j+2}$ of the band (Band 1). The frequency index position is dynamically changed according to the detection result, such that a sub-Doppler band having a power spectrum to be measured is changed. Specifically, if the detection result for commanding $S_{max}$ is determined to be $V_{indx}$, a frequency index for measuring the power spectrum may be established differently. An exemplary operation for changing a partial Doppler band will hereinafter be described with reference to the accompanying drawings.

Figure 3A:
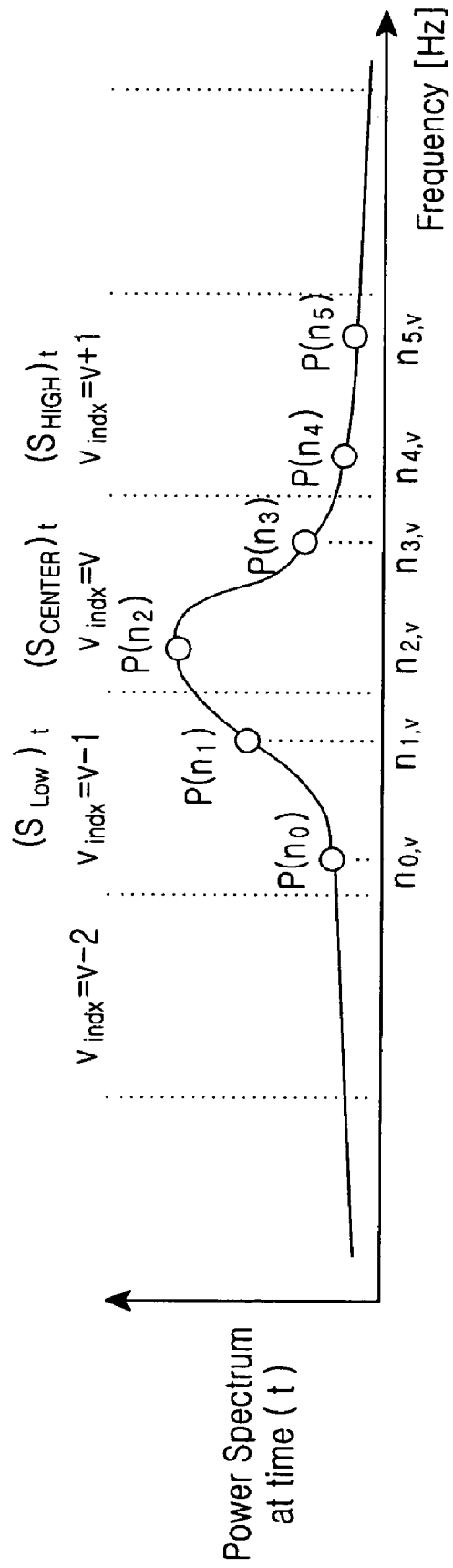
FIGS. 3A-3C are examples of changing frequency indexes to measure the Doppler spectrum after detecting the Doppler band when the velocity of the Mobile Station (MS) is decreased in accordance with an embodiment of the present invention.
Figure 3B:
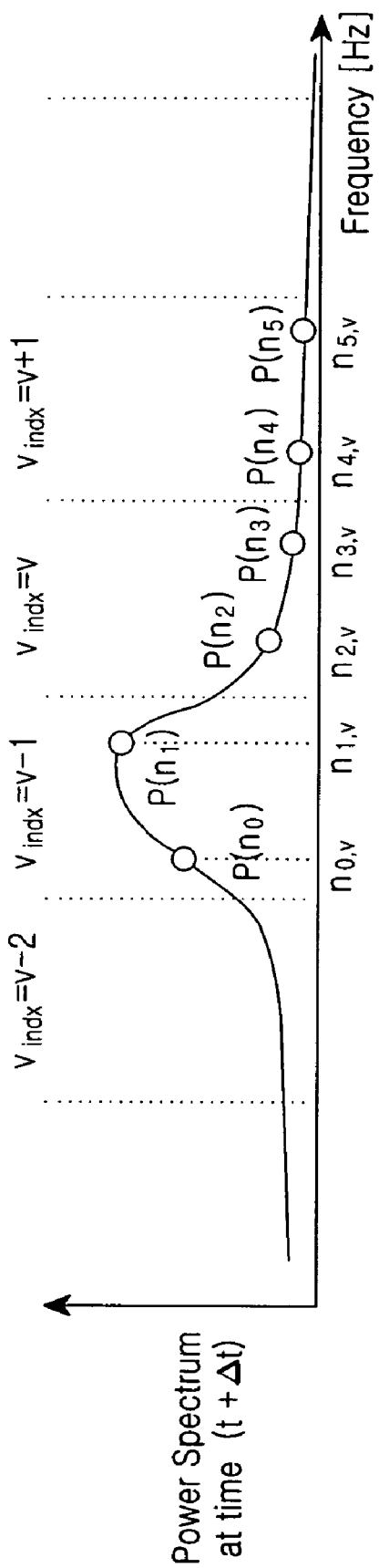
Figure 3C:
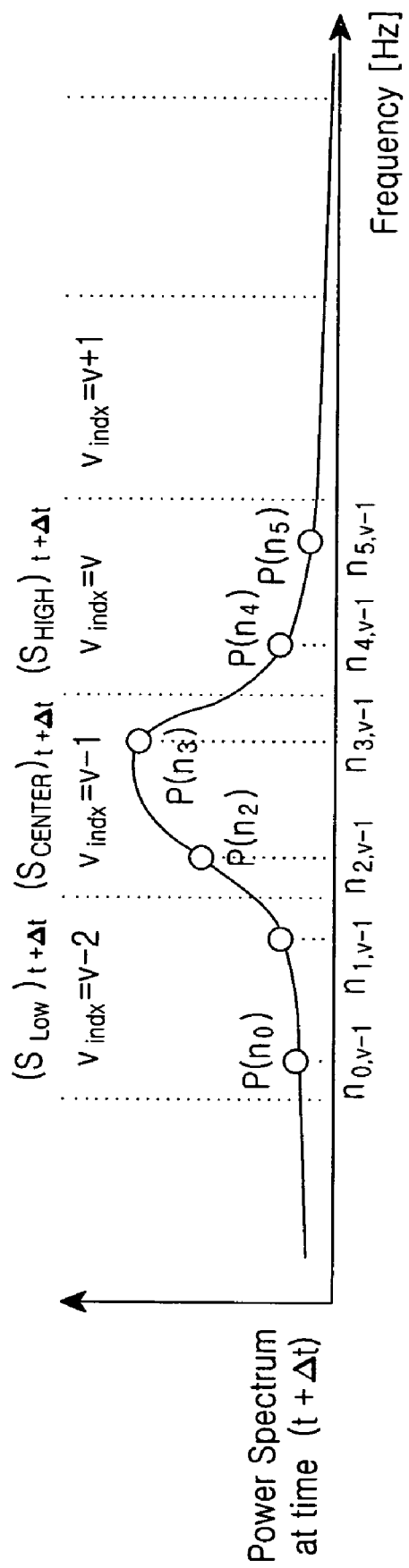

FIGS. 3A-3C are examples of changing frequency indexes to measure the Doppler spectrum after detecting the Doppler band when the velocity of the MS is decreased in accordance with an embodiment of the present invention.

In FIGS. 3A-3B, the number (q) of frequency indexes needed for detecting the Doppler band is determined to be '6', and the number of all the Si components (where $i=0 \sim M_{vel-1}$) is determined to be '2'. In other words, the number of frequency indexes needed for detecting only one Doppler band is equal to '2'.

Referring to FIG. 3A, the maximum value of the power spectrum measured at time (t) is measured at a point $n_{2,v}$. In this case, $V_{indx}$ is determined to be 'v', where $n_{i,j}$ is a frequency index i (i=0-5) in the case of $v_{indx}=j$ (j=0-$M_{vel-1}$).

A frequency index $n_{i,j}$ for measuring the power spectrum in the case of $v_{indx}=v$ is established to detect a Doppler band corresponding to $v_{indx}=v$, a low-frequency band ($v_{indx}=v-1$), and a high-frequency band ($v_{indx}=v+1$). In this case, the low-frequency band ($v_{indx}=v-1$) and the high-frequency band ($v_{indx}=v+1$) are closest to the Doppler band corresponding to $v_{indx}=v$. The detection sets for commanding an orientation of the sub-Doppler band are denoted by $(S_{CENTER})_t=\{n_{2,v}, n_{3,v}\}$, $(S_{LOW})_t=\{n_{0,v}, n_{1,v}\}$, and $(S_{HIGH})_t=\{n_{4,v}, n_{5,v}\}$.

As shown in FIG. 3B, if the maximum Doppler spectrum value at time t+Δt is observed at time $n_{1,v}$ contained in the Doppler band $V_{indx}=v-1((S_{LOW})_t)$, the velocity estimator 110 detects a new velocity of $v_{indx}=v-1$, and at the same time changes a frequency index $n_{i,v}$ for estimating the Doppler spectrum to another frequency index $n_{i,v-1}$. Therefore, as shown in FIG. 3C, the frequency index $n_{i,v-1}$ at $v_{indx}=v-1$ is established to detect the Doppler band corresponding to $v_{indx}=v-2$ and $v_{indx}=v$ in the same manner as in $n_{i,v}$. In this case, the detection sets for commanding an orientation at time t+Δt are determined to be $(S_{CENTER})_{t+\Delta t}=\{n_{2,v-1}, n_{3,v-1}\}$, $(S_{LOW})_{t+\Delta t}=\{n_{0,v-1}, n_{1,v-1}\}$, and $(S_{HIGH})_t=\{n_{4,v-1}, n_{5,v-1}\}$.

In the meantime, a frequency index change operation for estimating the Doppler spectrum when the velocity of the MS is increased will hereinafter be described with reference to FIGS. 4A-4C.

Figure 4A:
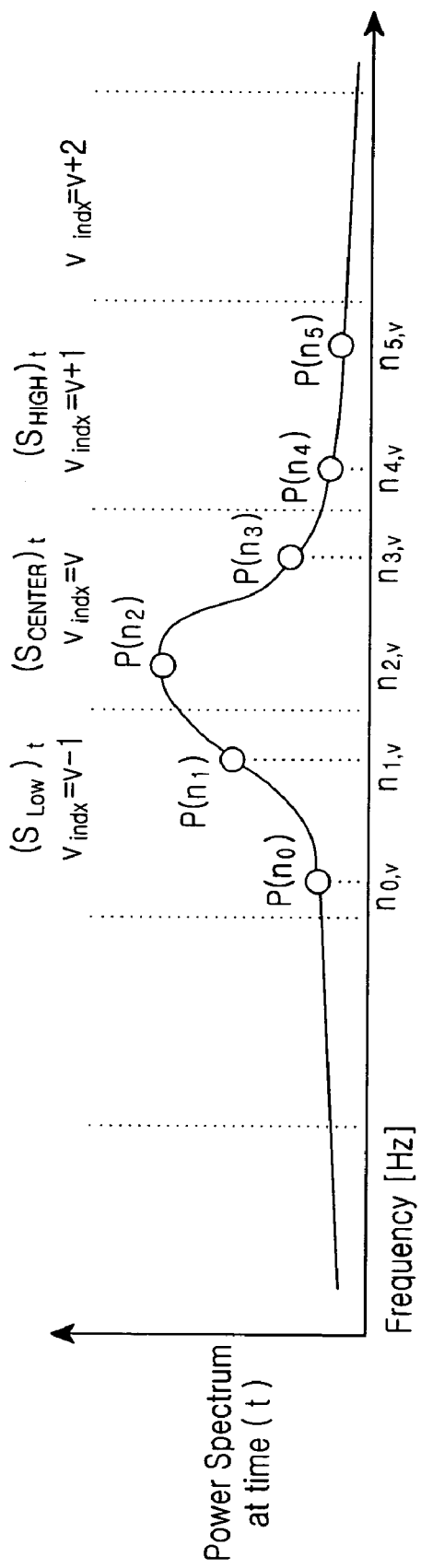
FIGS. 4A-4C are examples of changing frequency indexes to measure the Doppler spectrum after detecting the Doppler band when the velocity of the MS is increased in accordance with an embodiment of the present invention.
Figure 4B:
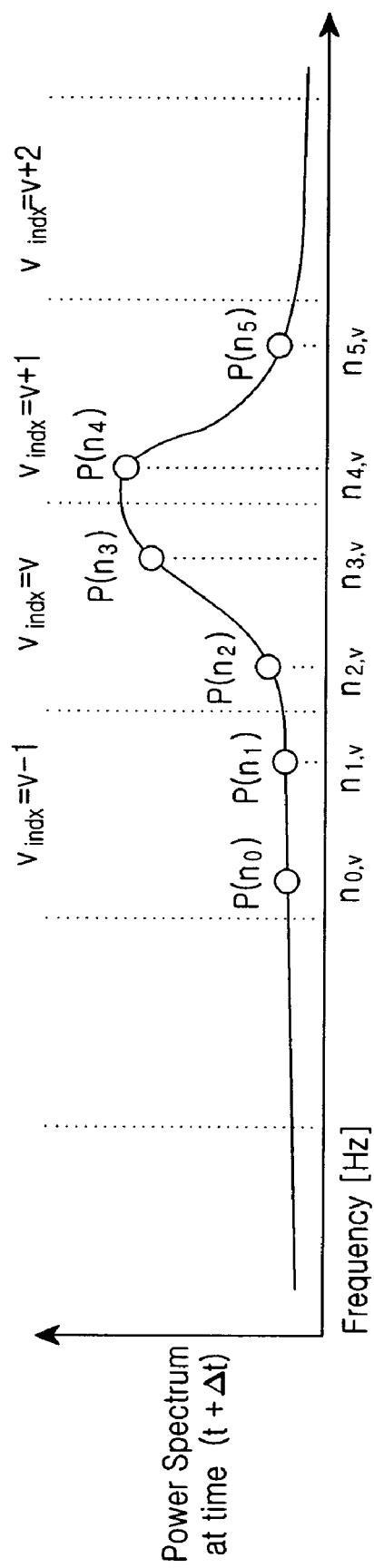
Figure 4C:
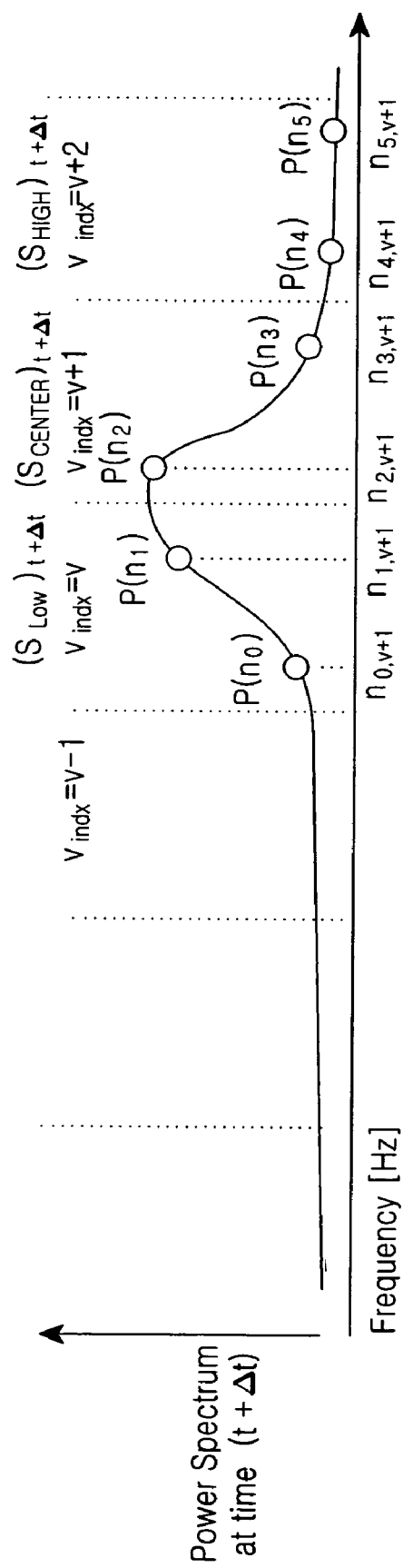

FIGS. 4A-4C are examples for changing frequency indexes to measure the Doppler spectrum after detecting the Doppler band when the velocity of the MS is increased in accordance with an embodiment of the present invention.

Referring to FIG. 4A, the maximum power spectrum measured at time (t) is measured at time $n_{2,v}$, and its detection result is denoted by $v_{indx}=v$. If the velocity of the MS is decreased, i.e., if the maximum Doppler spectrum value at time t+Δt is observed at time $n_{4,v}$ contained in the Doppler band $v_{indx}=v-1((S_{HIGH})_t)$, the velocity estimator 110 detects a new velocity of $v_{indx}=v+1$, and at the same time changes a frequency index $n_{i,v}$ for estimating the Doppler spectrum to another frequency index $n_{i,v+1}$. Therefore, as shown in FIG. 4C, the frequency index $n_{i,v+1}$ at $v_{indx}=v+1$ is established to detect the Doppler band corresponding to $v_{indx}=V$ and $v_{indx}=v+2$ in the same manner as in $n_{i,v}$ and $n_{i,v-1}$.

In this manner, the velocity estimator 110 subdivides an overall Doppler band to be detected into a plurality of Doppler bands, and dynamically changes a necessary frequency index needed for estimating the power spectrum, such that it detects a Doppler spectrum having a wide bandwidth, i.e., it detects the velocity of the MS even in a high-velocity band range.

Due to the aforementioned frequency index variation, the frequency index for measuring the Doppler power spectrum in the velocity estimator 110 is determined differently according to the velocity bands, and the determined frequency indexes are then generalized, such that they can be represented by the following equation 3:

$$(n_{i,j}) = \begin{bmatrix} n_{0,0} & n_{1,0} & \cdots & \cdots & n_{q-2,0} & n_{q-1,0} \\ n_{0,1} & n_{1,1} & \cdots & \cdots & n_{q-2,1} & n_{q-1,1} \\ \vdots & \vdots & \vdots & \vdots & \vdots & \vdots \\ n_{0,M_{vel}-2} & n_{1,M_{vel}-2} & \cdots & \cdots & n_{q-2,M_{vel}-2} & n_{q-1,M_{vel}-2} \\ n_{0,M_{vel}-1} & n_{1,M_{vel}-1} & \cdots & \cdots & n_{q-2,M_{vel}-1} & n_{q-1,M_{vel}-1} \end{bmatrix} \quad \text{Equation 3}$$

Figure 5:
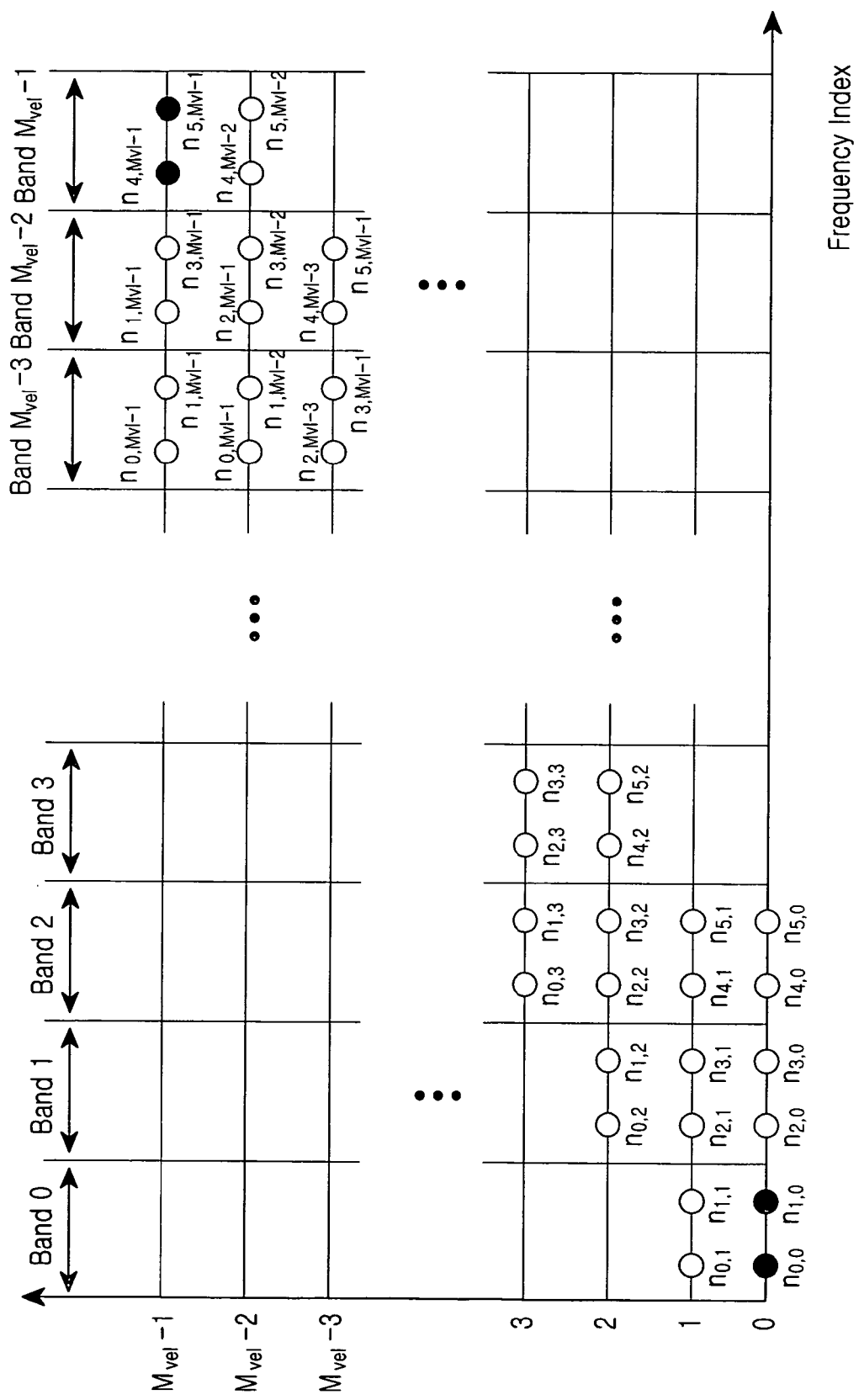
FIG. 5 is an example of determining the frequency index for measuring Doppler power spectrum differently according to velocity bands in accordance with an embodiment of the present invention.

FIG. 5 is an example of determining the frequency index for measuring Doppler power spectrum differently according to velocity bands in accordance with an embodiment of the present invention. A relative position design example based on the frequency axis of the frequency index shown in Equation 3 is shown in FIG. 5. In this case, if the detected Doppler band is determined to be $v_{indx}=0$ or $v_{indx}=M_{vel}-1$, it can be recognized that the Doppler band corresponding to a channel estimation coefficient controlled to be used is not positioned at the center (i.e., $S_{CENTER}$) due to a condition for limiting a positive number of each frequency and a maximum target Doppler bandwidth to be detected.

Figure 6A:
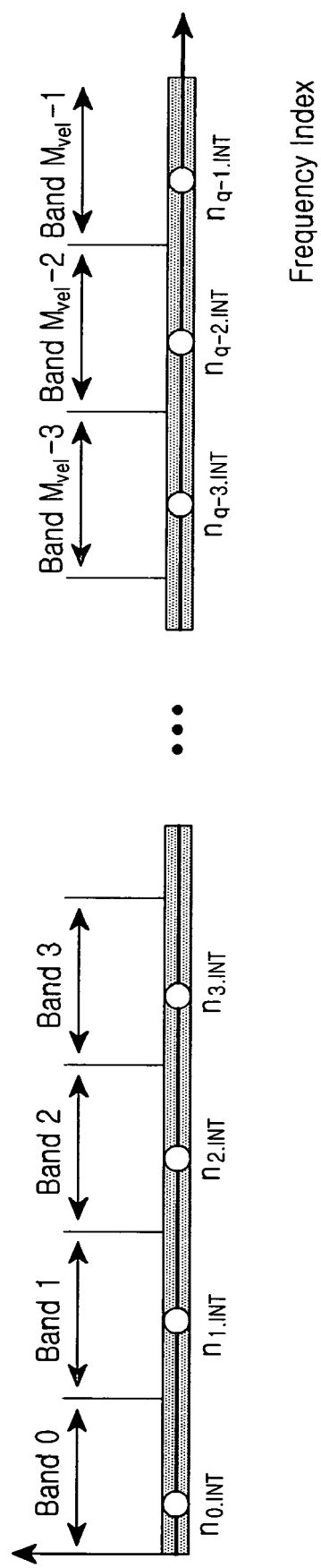
FIGS. 6A-6C are examples of establishing frequency indexes to measure the Doppler spectrum during an initial velocity detection process in accordance with an embodiment of the present invention.
Figure 6B:
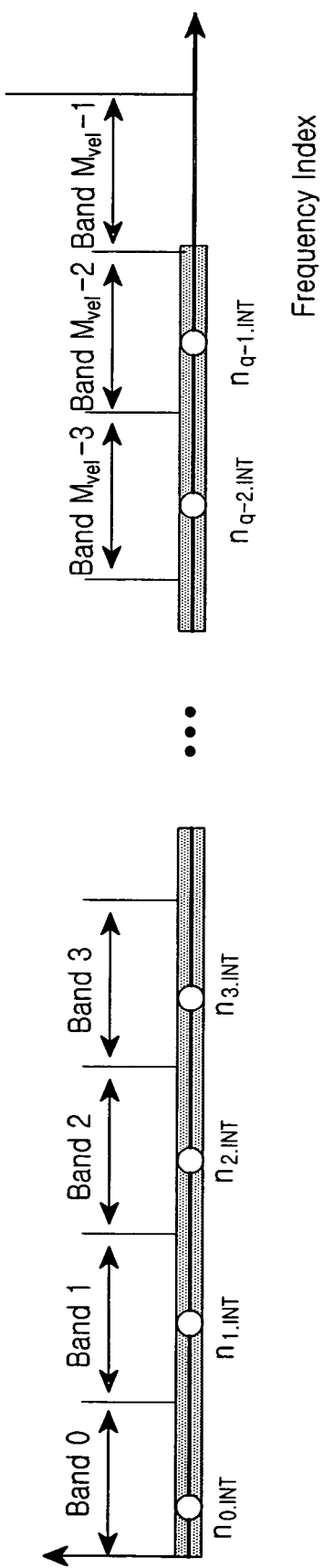
Figure 6C:
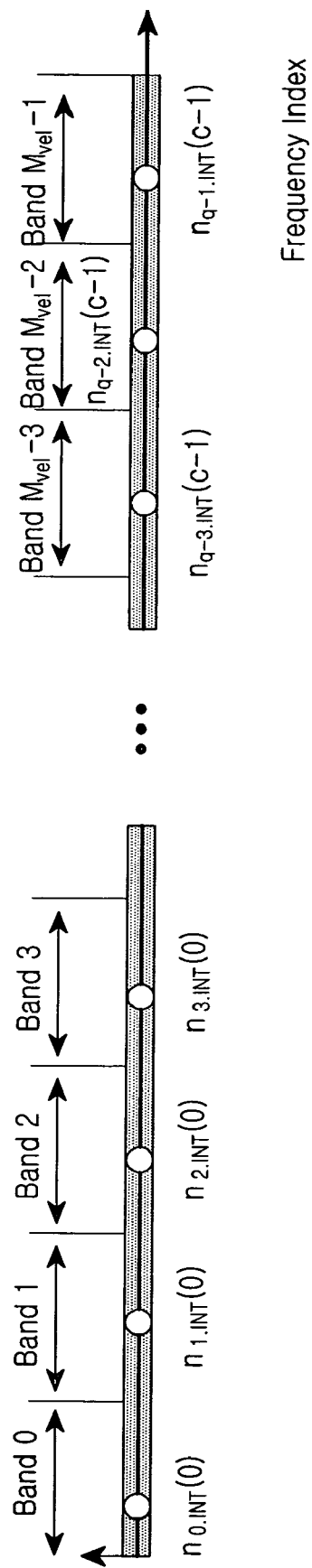

FIGS. 6A-6C are examples of establishing frequency indexes to measure the Doppler spectrum during an initial velocity detection process in accordance with an embodiment of the present invention.

In the case of detecting an initial velocity, only one frequency index is applied to each Doppler band to measure the Doppler spectrum in such a way that a frequency index is established. In the case of $q=M_{vel}$, as shown in FIG. 6A, individual frequency indexes are bound by $M_{vel}$, detection sets as shown in the following equation 4:

$$S_0 = \{n_{0,INIT}\} \quad \text{Equation 4}$$
$$S_1 = \{n_{1,INIT}\}$$
$$\vdots$$
$$S_{M_{vel}-1} = \{n_{q-1,INIT}\}$$

In the case of $q=M_{vel}-1$, as shown in FIG. 6B, individual frequency indexes are bound by $M_{vel}$ detection sets as shown in the following equation 5:

$$S_0 = \{n_{0,INIT}\} \quad \text{Equation 5}$$
$$S_1 = \{n_{1,INIT}\}$$
$$\vdots$$
$$S_{M_{vel}-2} = \{n_{q-1,INIT}\}$$

The velocity band $v_{indx}=M_{vel}-1(S_{Mvel-1})$, incapable of being detected by Equation 5, detects $v_{indx}=M_{vel}-2$ during the initial velocity detection process, and finally detects $v_{indx}=M_{vel}-1$ during the detection operations shown in Equation 3 and FIGS. 4A-4C, In the case of $q<M_{vel}-1$, as shown in FIG. 6B, individual frequency indexes are established by a time division detection method. Generally, a variation in the velocity of the MS (i.e., a degree of acceleration) is very slow as compared to a velocity detection period of the velocity estimator. If an operation period of a velocity estimator is determined to be $T_{avg}$, the velocity estimator measures the Doppler spectrum of the following equation 6 according to time (t) during an initial velocity detection process.

$$\{P(n_{i,INIT})(0)\} = \{P(n_{i,INIT}|_{t=0}), i = 0 \sim q-1\} \quad \text{Equation 6}$$
$$\{P(n_{i,INIT})(1)\} = \{P(n_{i,INIT}|_{t=1}), i = 0 \sim q-1\}$$
$$\vdots$$
$$\{P(n_{i,INIT})(k)\} = \{P(n_{i,INIT}|_{t=kT_{avg}}), i = 0 \sim q-1\}$$
$$\vdots$$
$$\{P(n_{i,INIT})(c-1)\} = \{P(n_{i,INIT}|_{t=(c-1)T_{avg}}), i = 0 \sim q-1\}$$

With reference to Equation 6, P(a)(b) is indicative of the Doppler power spectrum measured at a frequency index 'a' during an operation period 'b' of the velocity estimator, 'c' is indicative of '$M_{vel}/q$', and '•' is indicative of an integer raising operator. The detection set of Equation 6 can be denoted by the following equation 7:

$$S_0 = \{n_{0,INIT}|_{t=0}\} \quad \text{Equation 7}$$
$$S_1 = \{n_{1,INIT}|_{t=0}\}$$
$$\vdots$$
$$S_{q-1} = \{n_{q-1,INIT}|_{t=0}\}$$
$$S_q = \{n_{0,INIT}|_{t=1}\}$$
$$\vdots$$
$$S_{2q-1} = \{n_{q-1,INIT}|_{t=1}\}$$
$$S_{2q} = \{n_{0,INIT}|_{t=2}\}$$
$$\vdots$$
$$S_{M_{vel}-1} = \{n_{q-1,INIT}|_{t=(c-1)T_{avg}}\}$$

The final velocity band detection based on Equation 7 can be performed using a comparison among magnitudes of all the Doppler power spectrums calculated by the following equation 8:

$$n_{max} = \max_{n_i}\{P(n_{i,INIT})(k), i = 0 \sim q-1, k = 0 \sim c-1\} \quad \text{Equation 8}$$

As described above, the number of frequency indexes used for detecting individual bandwidths during an initial detection process, i.e., the number (S) of individual detection sets, is less than the number of elements of the set S of Equation 1 during a normal operation process. Therefore, the Doppler power spectrum measured during the initial detection process is much more affected by noise than that of the normal operation process, such that the number of erroneous elements may be unexpectedly increased. In order to solve the above problems, it is preferable that a velocity estimator operation period $T_{avg}$ during the initial detection process is determined to be longer than that of the normal operation process, such that the Doppler band can be stably detected.

It is preferable that a channel estimation coefficient to be used in a channel estimator before the velocity estimator detects an initial velocity is adapted as '$COEFM_{vel}-1$' having the widest bandwidth because there is no pre-given channel information or velocity estimator detection information, such that performance deterioration at an initial velocity detection time can be prevented. Overall operations of the velocity estimator having the aforementioned initial velocity detection function will hereinafter be described.

Figure 7A:
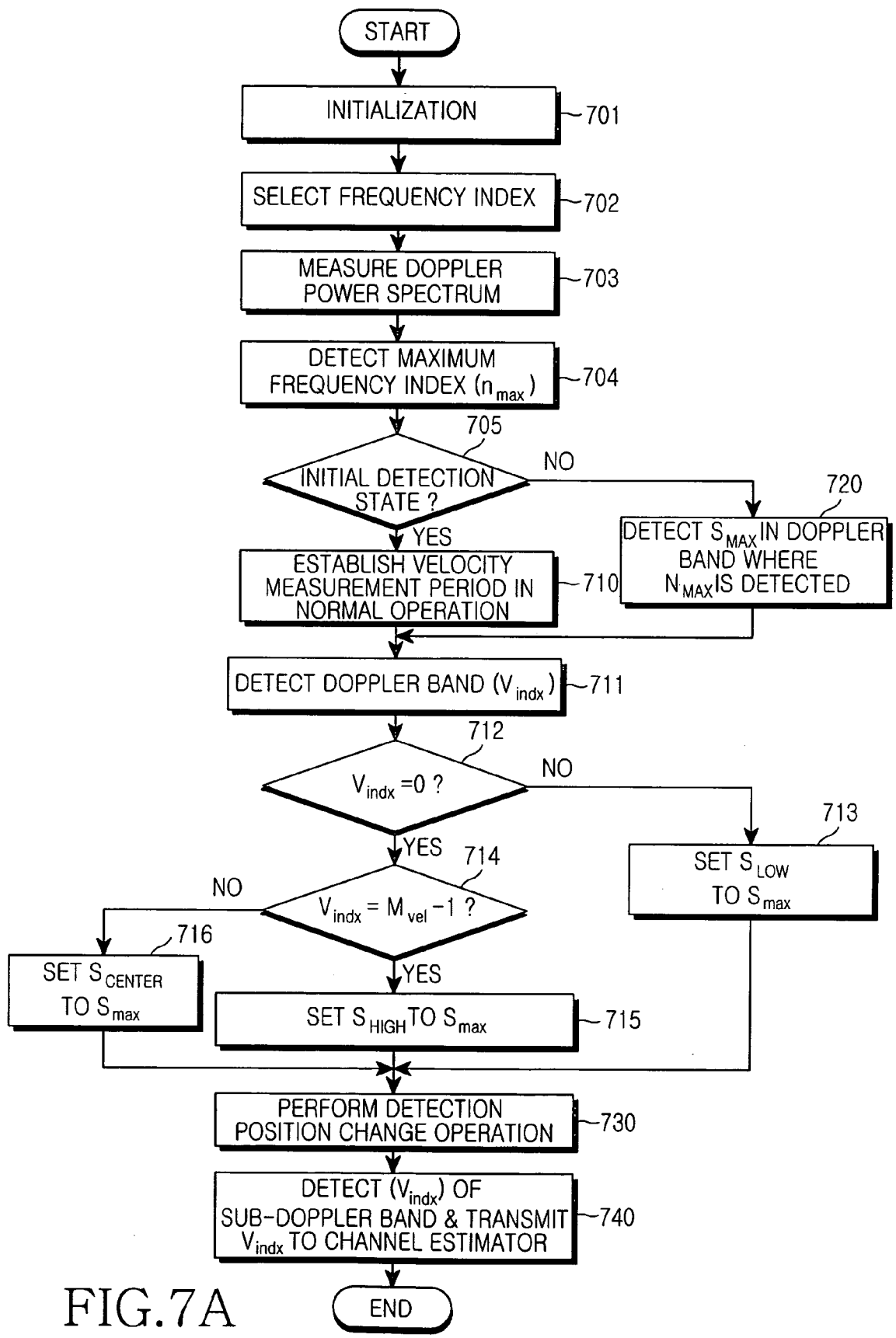
FIGS. 7A-7B are flow charts illustrating operations of the velocity estimator in accordance with an embodiment of the present invention.
Figure 7B:
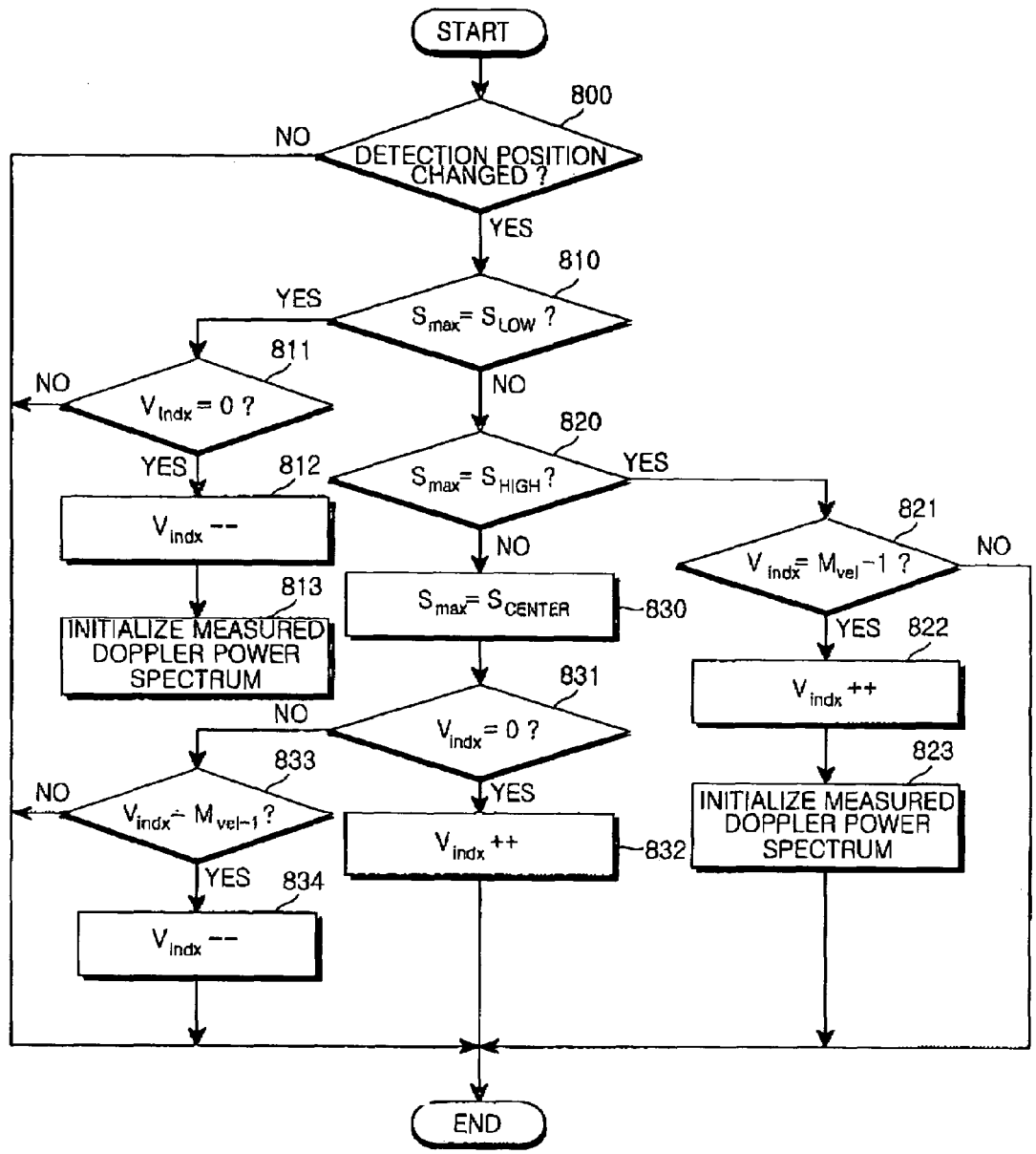

FIGS. 7A-7B are flow charts illustrating operations of the velocity estimator in accordance with an embodiment of the present invention.

Referring to FIGS. 7A-7B, the velocity estimator determines an initial velocity estimation period $T_{avg}$ (=INIT_N_OF_AVG>N_OF_AVG: velocity estimation period during a normal operation), and also determines a variety of values $v_{indx}$, $n_i$, and INIT to select an initial frequency index at step 701. In this case, the channel estimator establishes an initial value $v_{indx}=M_{vel}-1(S_{Mvel-1})$ before an initial detection time.

After establishing the initial value, the velocity estimator selects frequency indexes $n_i$ and $v_{indx}$ corresponding to a given value $v_{indx}$ as the detection result at step 702. The velocity estimator measures the Doppler power spectrum $P(n_i, v_{indx})$ corresponding to the frequency indexes $n_i$ and $v_{indx}$ during the $T_{avg}$ period at step 703, and detects a frequency index $n_{max}$ at which the maximum power spectrum is observed at step 704.

The velocity estimator determines whether the current state is an initial detection state or a normal detection state at step 705. If it is determined that the current state is equal to the initial detection state, the velocity estimator establishes a velocity estimation period (N_OF_AVG) in the normal operation state at step 710, such that it can detect a normal velocity from the next operation period. The velocity estimator applies the detected frequency index $n_{max}$ to the detection sets shown in Equations 4, 5, and 7, such that it detects the Doppler band $v_{indx}$ at step 711. Thereafter, in order to classify the cases of $v_{indx}=0$ and $v_{indx}=M_{vel}-1$ in which the frequency index is established as shown in FIG. 5, the velocity estimator determines whether the value of $v_{indx}$, is equal to '0' at step 712. If it is determined that the value of $v_{indx}$, is not equal to '0', the velocity estimator sets $S_{LOW}$ to $S_{max}$ at step 713, and goes to step 730. Otherwise, if it is determined that the value of $v_{indx}$, is equal to '0', the velocity estimator determines whether the value of $v_{indx}$ is equal to $M_{vel}-1$ at step 714. If it is determined that the value of $v_{indx}$ is equal to $M_{vel}-1$, the velocity estimator sets $S_{HIGH}$ to $S_{max}$ at step 715, and goes to step 730. Otherwise, if it is determined that the value of $v_{indx}$ is not equal to $M_{vel}-1$, the velocity estimator sets $S_{CENTER}$ to $S_{max}$ at step 716, and goes to step 730.

In the meantime, if it is determined that the current state is indicative of the normal detection state at step 705, the velocity estimator determines $S_{max}$ to be a set corresponding to a Doppler band in which the maximum frequency index $n_{max}$ is detected at step 720. Specifically, if the measured Doppler power spectrum is detected in a frequency band higher than that of the detected $v_{indx}$, the velocity estimator determines $S_{HIGH}$. If the measured Doppler power spectrum is detected in a frequency band lower than that of the detected $v_{indx}$, the velocity estimator determines $S_{LOW}$. If there is no difference between the measured Doppler power spectrum and the detected $v_{indx}$, the velocity estimator determines $S_{CENTER}$. However, in the exceptional cases of $v_{indx}$ and $v_{indx}=M_{vel}-1$, the velocity estimator determines $S_{LOW}$ and $S_{HIGH}$, respectively. In this manner, if the velocity estimator performs the aforementioned operation state classification and band detection classification, the velocity estimator performs a detection position change operation according to the velocity estimator of the MS at step 730, detects $v_{indx}$ of a changed sub-Doppler band, transmits the detected $v_{indx}$ to the channel estimator at step 740, and terminates all operations. The detection position change operation at the above step 730 will hereinafter be described with reference to FIG. 7B.

Referring to FIG. 7B, the velocity estimator determines whether a detection position of the sub-Doppler band is changed at step 800. If it is determined that there is no change in the detection position of the sub-Doppler band, the velocity estimator terminates all operations. Otherwise, if it is determined that there is a change in the detection position of the sub-Doppler band, the velocity estimator determines whether $S_{max}$ is equal to $S_{LOW}$ at step 810. If it is determined that $S_{max}$ is equal to $S_{LOW}$, the velocity estimator needs to drop a current detection position to a lower sub-Doppler band, such that the sub-Doppler band in which a current Doppler spectrum is measured can be detected at the center position. In this case, the velocity estimator determines whether $v_{indx}$ is equal to '0' at step 811. If it is determined that $v_{indx}$ is not equal to '0', the velocity estimator terminates all operations. Otherwise, if it is determined that $v_{indx}$ is equal to '0', the velocity estimator reduces the value of $v_{indx}$ (i.e., detection position) at step 812. Thereafter, the velocity estimator initializes the measured Doppler power spectrum at step 813.

In the meantime, if it is determined that $S_{max}$ is not equal to $S_{LOW}$, the velocity estimator determines whether $S_{max}$ is equal to $S_{HIGH}$ at step 820. If it is determined that $S_{max}$ is equal to $S_{HIGH}$, the velocity estimator needs to raise a current detection position to a higher sub-Doppler band. The velocity estimator determines whether $v_{indx}$ is equal to $M_{vel}-1$ at step 821. If it is determined that $v_{indx}$ is not equal to $M_{vel}-1$ at step 821, the velocity estimator terminates all operations. Otherwise, if it is determined that $v_{indx}$ is equal to $M_{vel}-1$ at step 821, the velocity estimator increases the value of $v_{indx}$ to raise a detection position at step 822, and initializes the measured Doppler spectrum at step 823.

If it is determined that $S_{max}$ is not equal to $S_{HIGH}$ at step 820, the velocity estimator determines $S_{max}$ to be $S_{CENTER}$ at step 830. Therefore, the velocity estimator determines whether the value of $v_{indx}$ is equal to '0' at step 831. If it is determined that $v_{indx}$ is equal to '0', the velocity estimator raises a detection position to a sub-Doppler band corresponding to $v_{indx}=1$ at step 832, and terminates all operations. Otherwise, if it is determined that $v_{indx}$ is not equal to '0', the velocity estimator determines whether $v_{indx}$ is equal to $M_{vel}-1$ at step 833. If it is determined that $v_{indx}$ is equal to $M_{vel}-1$ at step 833, the velocity estimator reduces a detection position to a Doppler band corresponding to $v_{indx}=M_{vel}-2$ at step 834, and terminates all operations. Otherwise, if it is determined that $v_{indx}$ is not equal to $M_{vel}-1$ at step 833, i.e., if $v_{indx}$ is determined to be '0~$M_{vel}-2$', this indicates that a detection position of the sub-Doppler band is fixed, i.e., there is no change in the velocity of the MS, such that the velocity estimator terminates all operations without updating the detection position. The velocity estimator transmits the finally-detected and updated velocity band information (i.e., $v_{indx}$ information) to the channel estimator using the above detection position change operation, and controls the channel estimator to use a corresponding channel estimation coefficient $COEFv_{indx}$.

As apparent from the above description, an embodiment of the present invention subdivides an overall Doppler band into sub-Doppler bands, and changes a detection position of the sub-Doppler band according to the velocity of a Mobile Station, such that it maintains a minimum amount of resources, dynamically and stably detects the velocity of the MS currently moving at a high speed, resulting in improved decoding performance of a received signal.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Base Station (BS) apparatus for estimating a velocity of a Mobile Station (MS) in a mobile communication system, comprising:

a channel estimator for performing channel estimation according to a velocity band, receiving a wireless channel signal from the MS, and performing channel estimation using channel estimation coefficients optimized for individual velocity bands; and a velocity estimator for dividing the velocity band into a plurality of sub-Doppler bands, detecting a sub-Doppler band including a frequency index having a maximum frequency response from among the divided sub-Doppler bands, and transmitting information of the detected sub-Doppler band to the channel estimator such that a channel estimation coefficient corresponding to the information is transmitted.

2. The apparatus according to claim 1, wherein the velocity estimator changes a detection position of the sub-Doppler band including the frequency index having the maximum frequency response according to the velocity of the MS.

3. The apparatus according to claim 2, wherein:
the detection position is changed to a lower sub-Doppler band when the velocity of the MS is decreased, such that the sub-Doppler band including the frequency index having the maximum frequency response can be detected at a center position.

4. The apparatus according to claim 2, wherein:
the detection position is changed to a higher sub-Doppler band when the velocity of the MS is increased, such that the sub-Doppler band including the frequency index having the maximum frequency response can be detected at a center position.

5. The apparatus according to claim 1, wherein:
the frequency index having the maximum frequency response selects a frequency index corresponding to the velocity band during a predetermined period, and measures power spectrums of sub-Doppler bands corresponding to the frequency index such that a maximum power spectrum is measured.

6. The apparatus according to claim 1, wherein:
the channel estimation coefficients are optimized for a predetermined number of Doppler frequency bands corresponding to a predetermined number of velocity bands.

7. A method for estimating a velocity of a Mobile Station (MS) in a Base Station (BS) device of a mobile communication system, comprising the steps of:
determining a channel estimation process according to a velocity band, receiving a wireless channel signal from the MS, and performing channel estimation using channel estimation coefficients optimized for individual velocity bands; and
dividing the velocity band into a plurality of sub-Doppler bands, detecting sub-Doppler band information corresponding to the estimation coefficients from a sub-Doppler band including a frequency index having a maximum frequency response from among the divided sub-Doppler bands during a predetermined period, and changing a detection position of the sub-Doppler band including the frequency index having the maximum frequency response according to the velocity of the MS such that a velocity estimation step is performed.

8. The method according to claim 7, wherein:
the frequency index having the maximum frequency response selects a frequency index corresponding to the velocity band during a predetermined period, and measures power spectrums of sub-Doppler bands corresponding to the frequency index such that a maximum power spectrum is measured.

9. The method according to claim 7, wherein the velocity estimation step includes the steps of:
dividing the velocity band into a predetermined number of sub-Doppler bands;
detecting a sub-Doppler band including a frequency index having a maximum frequency response from among the divided sub-Doppler bands during a predetermined period;
detecting sub-Doppler band information corresponding to the estimation coefficient from the detected sub-Doppler band;
determining an operation state when the sub-Doppler band information is detected;
comparing the detected sub-Doppler band information with pre-detected sub-Doppler band information according to the determined operation state, and determining a detection set; and
changing a detection position of the sub-Doppler band information according to the velocity of the MS.

10. The method according to claim 9, wherein:
the detection position is changed to a lower sub-Doppler band when the velocity of the MS is decreased, such that the sub-Doppler band including the frequency index having the maximum frequency response can be detected at a center position.

11. The method according to claim 9, wherein:
the detection position is changed to a higher sub-Doppler band when the velocity of the MS is increased, such that the sub-Doppler band including the frequency index having the maximum frequency response can be detected at a center position.

12. The method according to claim 9, wherein:
if the determined operation state is indicative of a normal operation state, the detection set is determined differently according to first to third cases, the first case where the Doppler band information is positioned in a high frequency band higher than that of the pre-detected sub-Doppler band information, the second case where the Doppler band information is positioned in a low frequency band lower than that of the pre-detected sub-Doppler band information, and the third case where there is no change between the Doppler band information and the pre-detected sub-Doppler band information.

13. The method according to claim 9, wherein:
if the determined operation state is indicative of an initial detection state, the channel estimation coefficient to be used for the channel estimation process is determined to be a velocity band having the widest bandwidth.

14. The method according to claim 9, wherein: if the determined operation state is indicative of an initial detection state, the sub-Doppler band information is detected as a different detection set.

15. The method according to claim 14, wherein:
the initial detection state is provided when the number of frequency indexes is equal to the number of sub-Doppler bands, such that a magnitude of the frequency response is calculated using a frequency index per sub-Doppler band during the initial detection state.

16. The method according to claim 14, wherein:
if the number of frequency indexes is less than the number of sub-Doppler bands by one in the initial detection state, the frequency response is calculated using a frequency index per the remaining sub-Doppler bands other than the sub-Doppler band having a maximum high frequency band from among the sub-Doppler bands.

17. The method according to claim 14, wherein:
if the number of frequency indexes is less than the number of sub-Doppler bands by at least two in the initial detection state, the frequency response is calculated by applying a frequency index to all sub-Doppler bands using a time division measurement process.

18. The method according to claim 7, wherein:
the channel estimation coefficients are optimized for a predetermined number of Doppler frequency bands corresponding to a predetermined number of velocity bands.

* * * * *